March 15, 1966 R. L. SNYDER 3,241,127

MAGNETIC DOMAIN SHIFTING MEMORY

Filed July 28, 1961 9 Sheets-Sheet 1

INVENTOR.
RICHARD L. SNYDER,
BY
Walter J. Adam
ATTORNEY.

MAGNETIC DOMAIN SHIFTING MEMORY

Filed July 28, 1961 9 Sheets-Sheet 2

INVENTOR.
RICHARD L. SNYDER,
BY
Walter J. Adam
ATTORNEY.

March 15, 1966 R. L. SNYDER 3,241,127

MAGNETIC DOMAIN SHIFTING MEMORY

Filed July 28, 1961 9 Sheets-Sheet 3

INVENTOR.
RICHARD L. SNYDER,
BY
Walter J. Adam
ATTORNEY.

March 15, 1966 R. L. SNYDER 3,241,127

MAGNETIC DOMAIN SHIFTING MEMORY

Filed July 28, 1961 9 Sheets-Sheet 4

INVENTOR.
RICHARD L. SNYDER,
BY
Walter J. Adam
ATTORNEY.

INVENTOR.
RICHARD L. SNYDER,
BY
Walter J. Adam
ATTORNEY

MAGNETIC DOMAIN SHIFTING MEMORY

Filed July 28, 1961 9 Sheets-Sheet 6

INVENTOR.
RICHARD L. SNYDER,
BY
Walter J. Adam
ATTORNEY

March 15, 1966 R. L. SNYDER 3,241,127

MAGNETIC DOMAIN SHIFTING MEMORY

Filed July 28, 1961 9 Sheets-Sheet 7

INVENTOR.
RICHARD L. SNYDER,
BY
Walter J. Adam
ATTORNEY

MAGNETIC DOMAIN SHIFTING MEMORY

Filed July 28, 1961 9 Sheets-Sheet 8

INVENTOR.
RICHARD L. SNYDER,
BY
Walter J. Adam
ATTORNEY.

INVENTOR.
RICHARD L. SNYDER,
BY
Walter J. Adam
ATTORNEY.

United States Patent Office 3,241,127
Patented Mar. 15, 1966

3,241,127
MAGNETIC DOMAIN SHIFTING MEMORY
Richard L. Snyder, Malibu, Calif., assignor to Hughes Aircraft Company, Culver City, Calif., a corporation of Delaware
Filed July 28, 1961, Ser. No. 129,936
18 Claims. (Cl. 340—174)

This invention relates to computer memory systems and particularly to a simplified and improved binary storage system utilizing a phenomena of magnetic domain wall shifting in a magnetic medium.

In conventional memory systems selection of a word line or a binary element is accomplished by energizing an X or row conductor and a Y or column conductor in coincidence so that two half currents adding at the desired cores develop magnetic fields that change the state of the cores. This coincidence arrangement has the disadvantage of complexity because of the large number of wound cores and because the conductors are addressed during both reading and writing. Also, the values of the half currents are very critical as variations thereof may cause the cores to improperly function. Further, the system is highly pattern sensitive during writing as the driving impedance varies over a wide range with the number of cores driven to an opposite state.

It is therefore an object of this invention to provide a memory element in which information may be written into and read from without employing coincident current driving of the magnetic medium.

It is a further object of this invention to provide an improved and simplified memory element that is relatively insensitive to the binary pattern being written into or read therefrom.

It is still a further object of this invention to provide a magnetic storage system that is simply and easily constructed such as by loom weaving techniques.

It is another object of this invention to provide a memory array in which the words are addressed during reading but no addressing operation is required during writing.

It is another object of this invention to provide a word organized memory utilizing the relative position of a wall between two magnetic domains of opposite polarity of magnetization for storage without changing the magnetic polarity of the domains.

It is another object of this invention to provide a memory array utilizing a new mode of selection not requiring switching means between the row and column addressing conductors and the word lines.

Briefly, in accordance with this invention, an elongated magnetic medium is magnetically coupled with two adjacent domain forming means for establishing two domains of opposite magnetic polarity with a wall region therebetween. During writing, a sense and control or digit means magnetically coupled to the medium responds to current applied in a selected first or a second direction to move the wall from a neutral position between the two domain forming means to a first or second end position adjacent to one of the domain forming means. Detent means are provided to apply a magnetizing force to reliably maintain the domain wall at the selected first or second end. Read driving means are magnetically coupled to the medium to move the domain wall to the neutral position during reading for sensing an output signal of a first or second polarity in the sense and control means. In a word organized array in accordance with the invention, selection during reading is accomplished by applying address pulses to row and column addressing leads so as to select the read coils in a word line. During writing, digit coils which may form the digit means of the binary elements of each word line are energized to record information in only the previously read word without utilizing the address arrangement. A second memory array in accordance with this invention, includes biasing means coupled to the read coils so as to eliminate the separate detent means or coils and to provide a new mode of selection not requiring switching means in the word lines.

The novel features of this invention, as well as the invention itself, will best be understood from the accompanying description taken in connection with the accompanying drawings, in which like characters refer to like parts, and in which.

Figure 1:
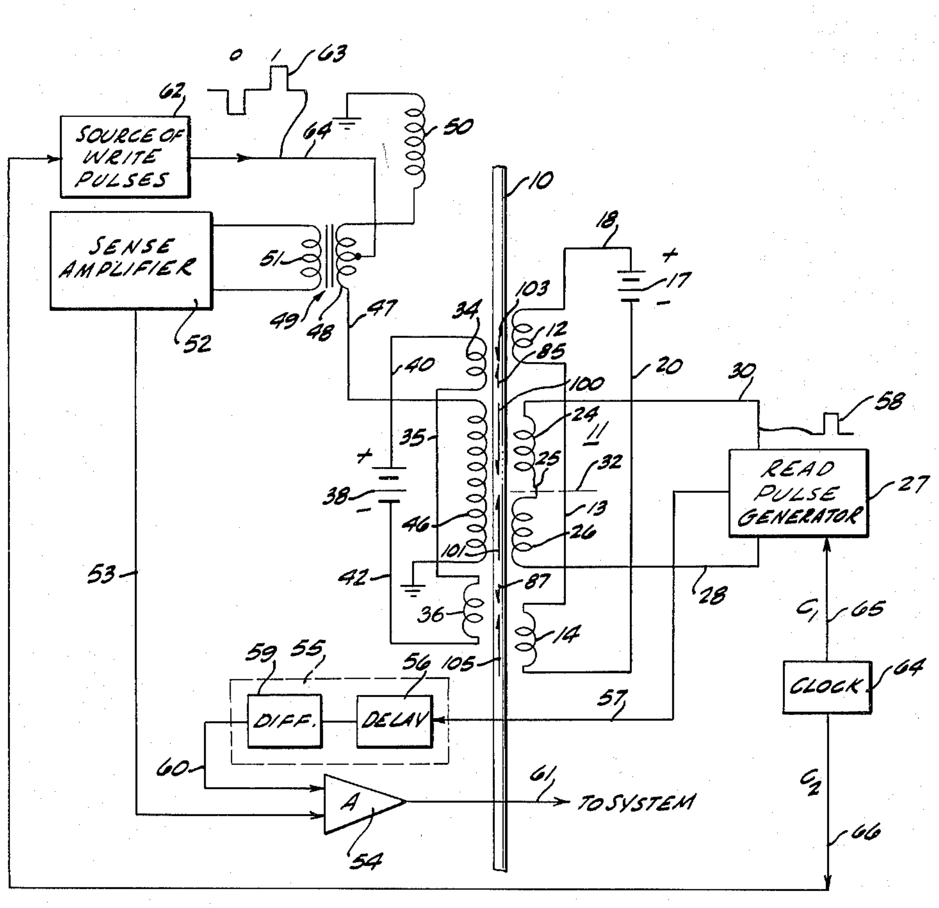
FIG. 1 is a schematic circuit and block diagram of a domain wall shifting memory element in accordance with the invention.
Figure 5:
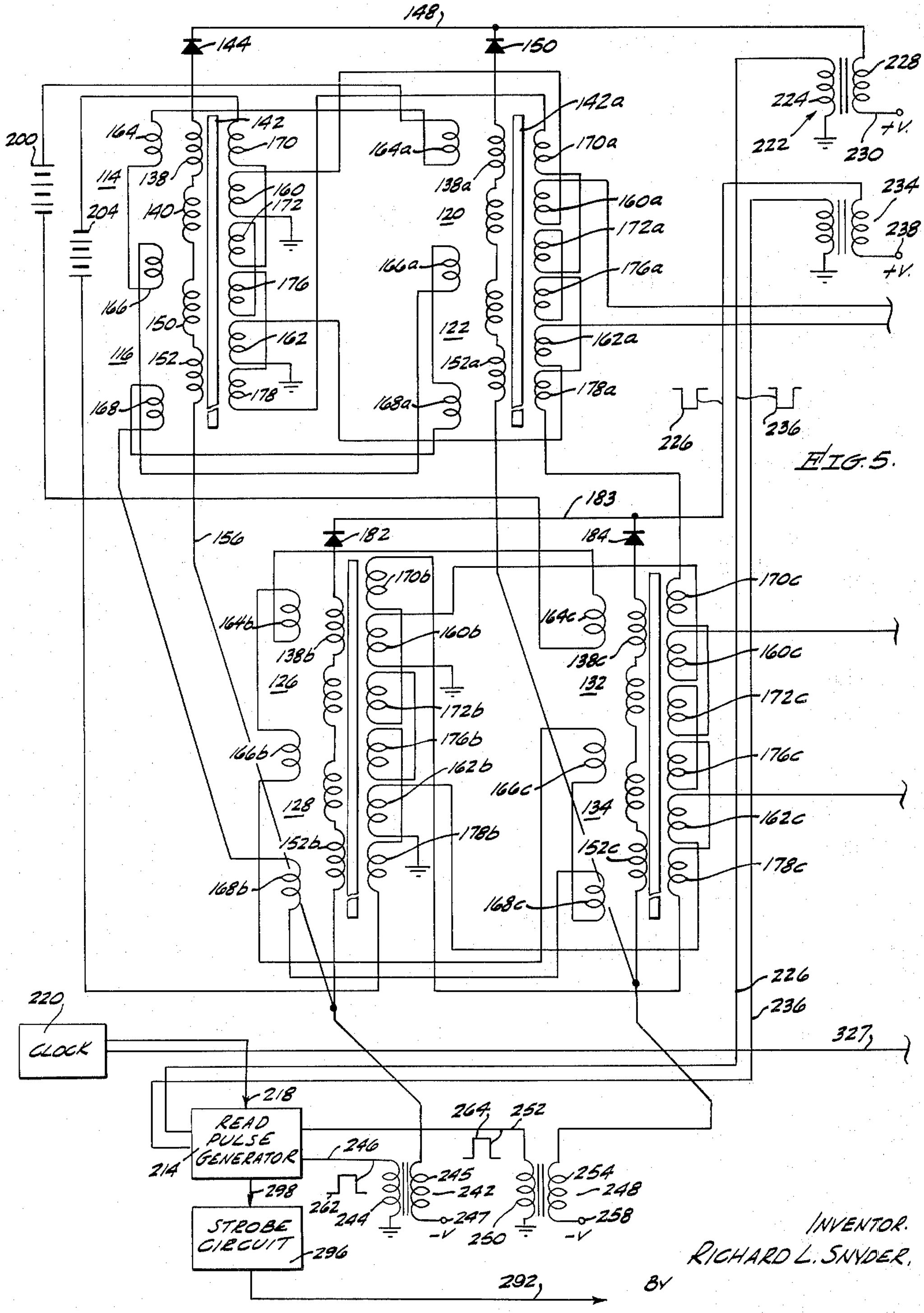
Figure 5A:
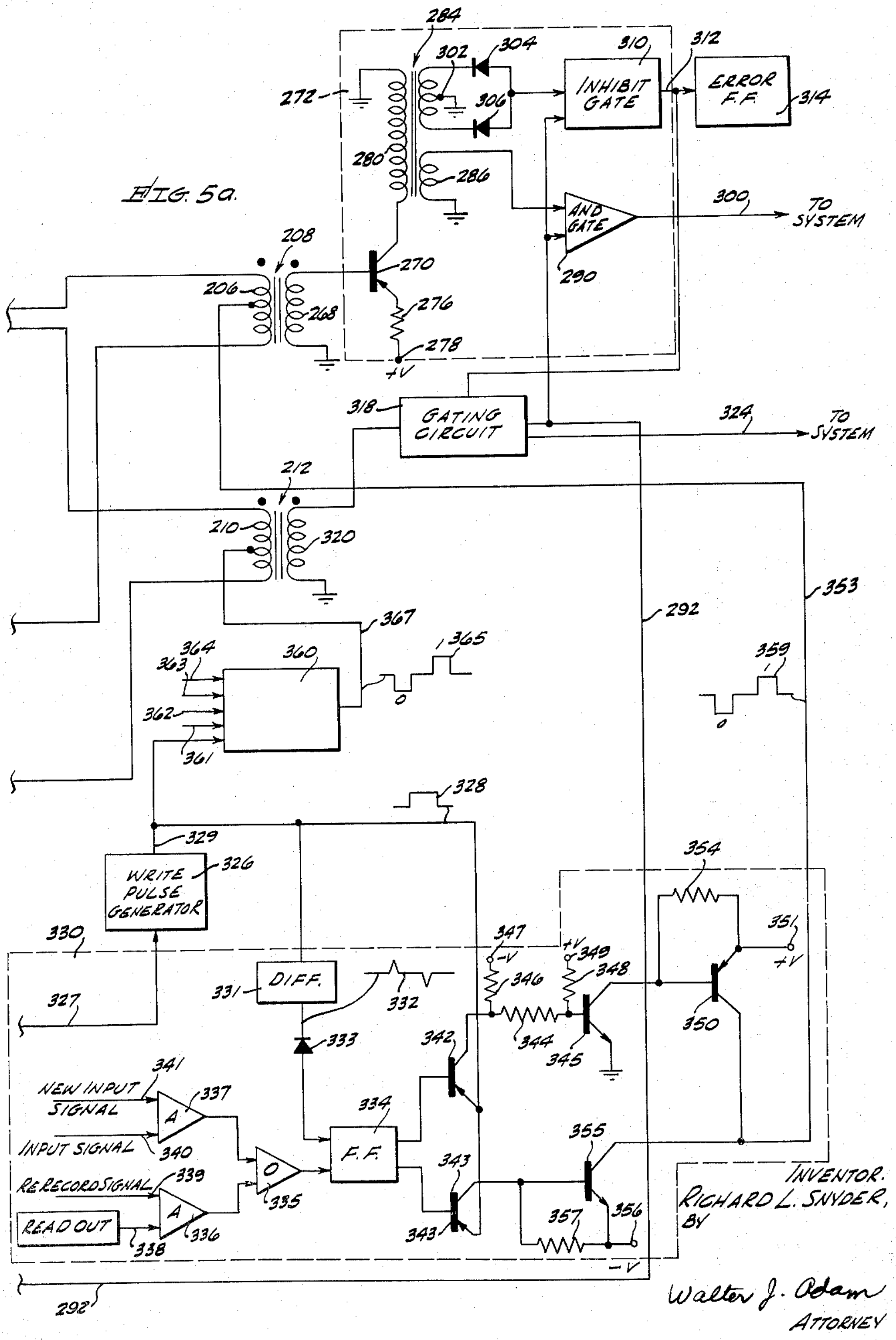
Figure 7:
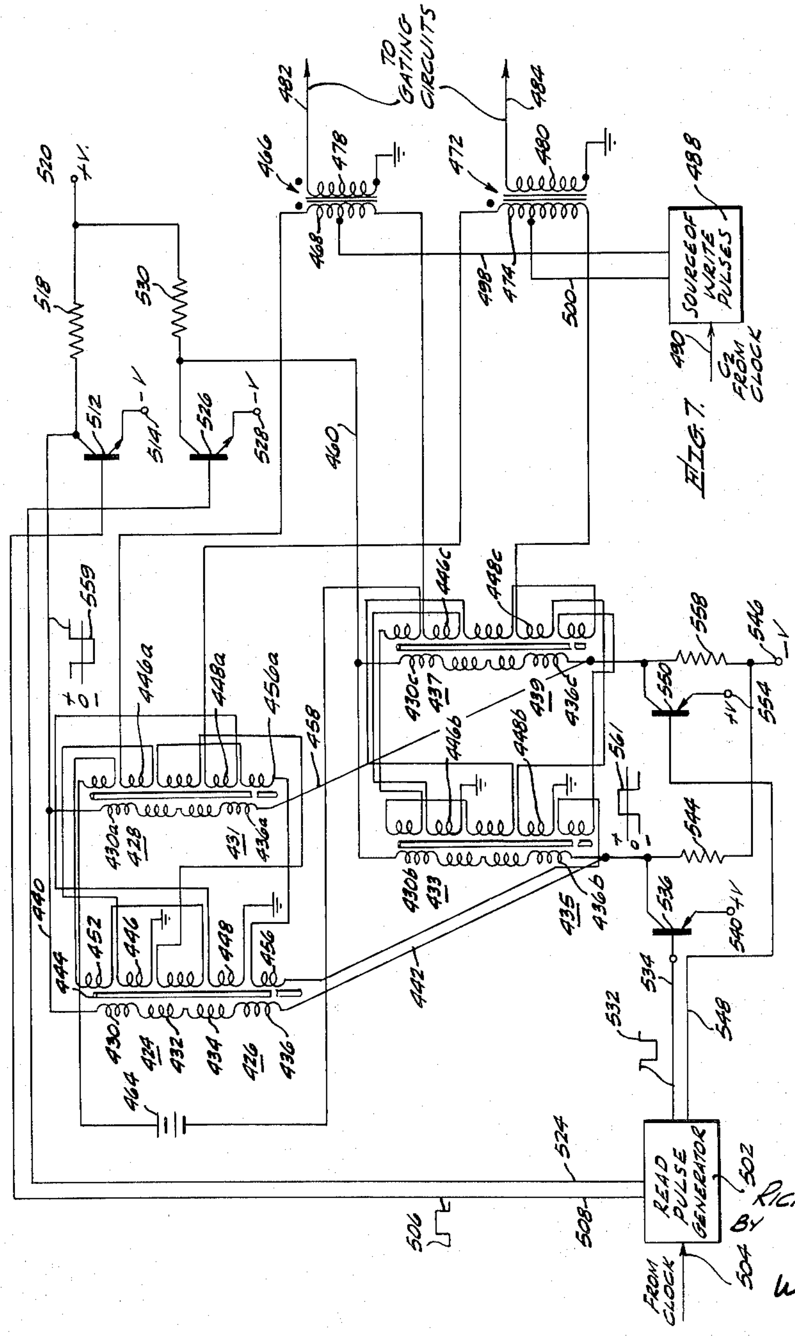
Figure 6:
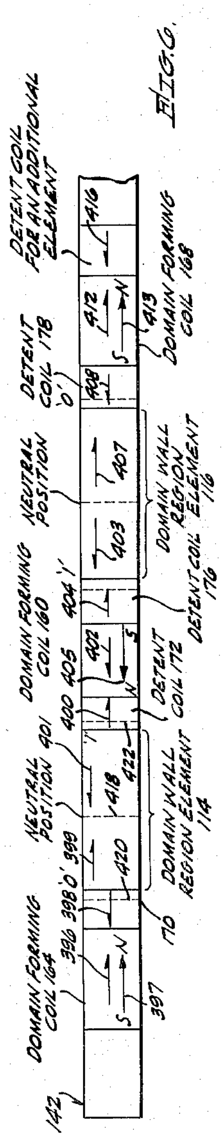
Figure 8:
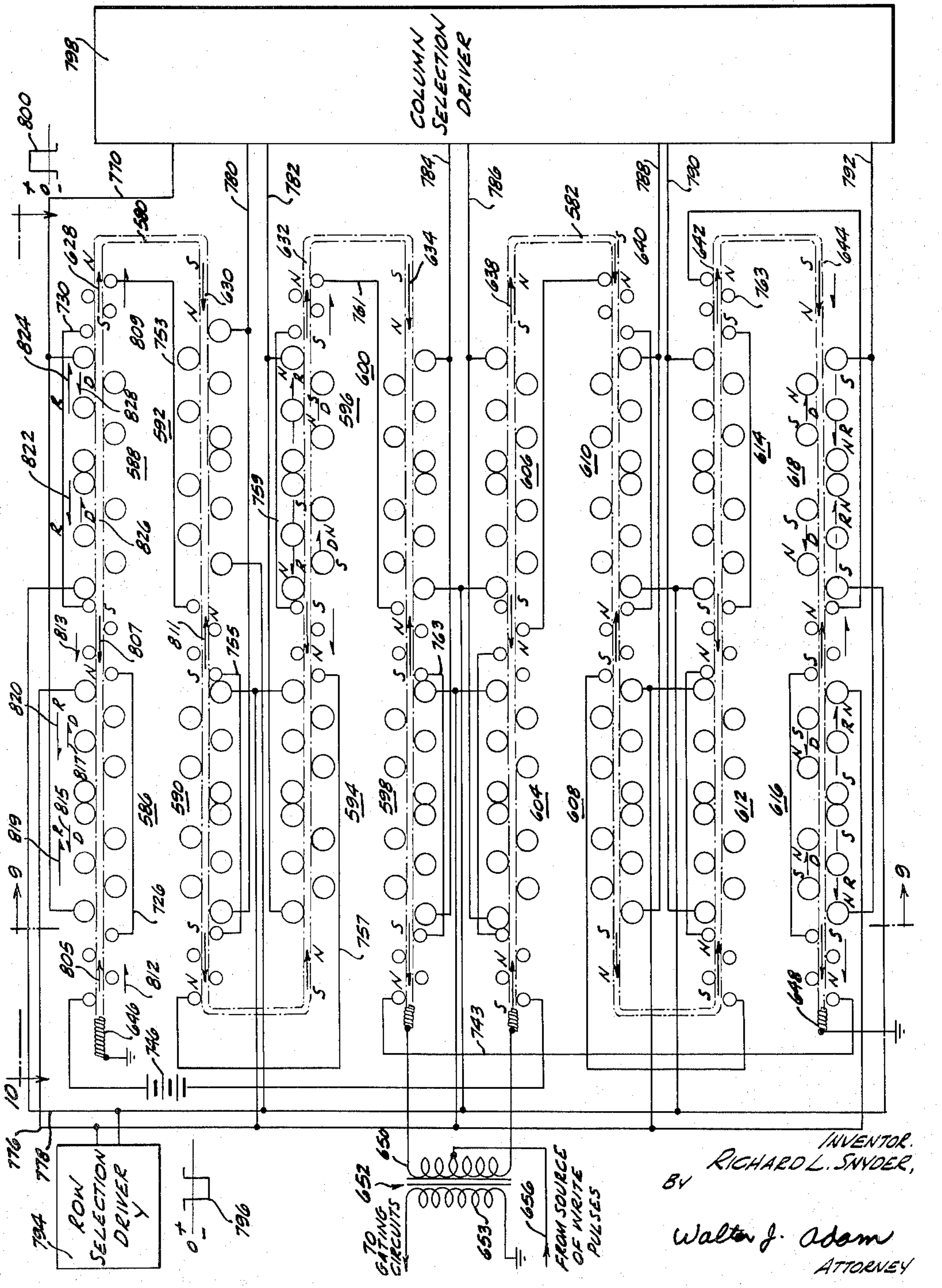
Figure 9:
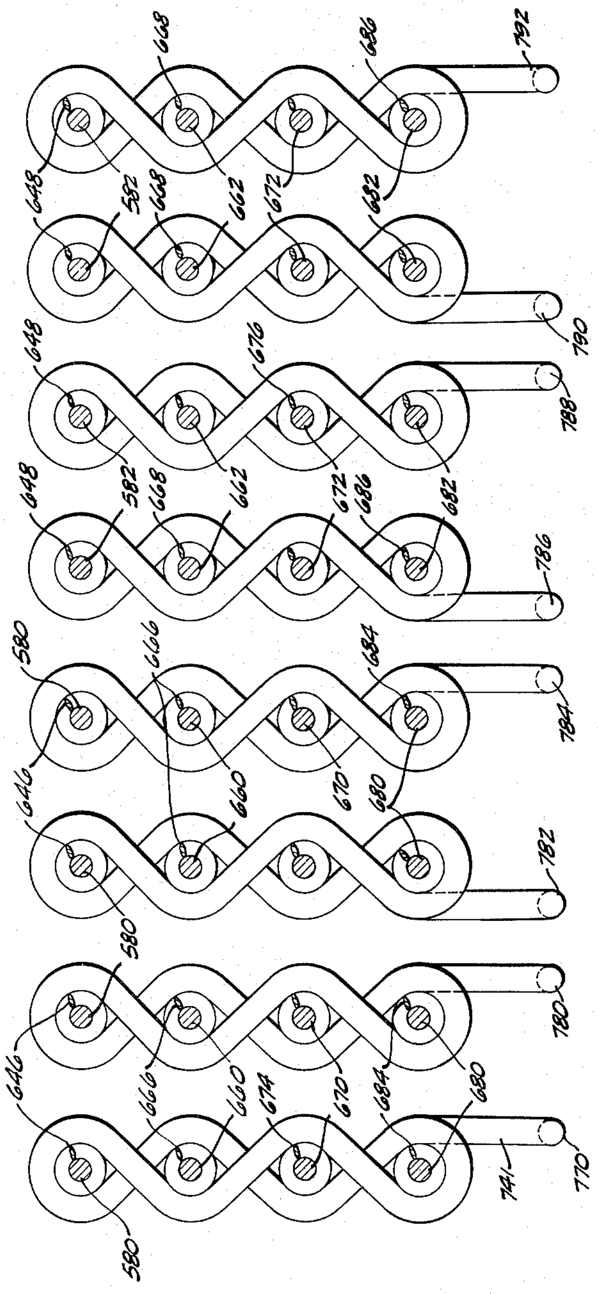

FIGS. 5 and 5*a* together are a perspective diagram of a word organized memory system utilizing the memory element of FIG. 1 and including detent coils;

FIG. 6 is a schematic diagram for further explaining the arrangement of the coils of FIG. 5;

FIG. 7 is a perspective diagram of a memory system in accordance with the invention arranged to operate without the detent coils and to provide word selection by utilizing an impedance network;

FIG. 8 is a schematic partially sectional plan view of a memory array in accordance with this invention particularly applicable to construction by loom weaving;

FIG. 9 is a sectional view taken at lines 9—9 of FIG. 8; and

Figure 10:
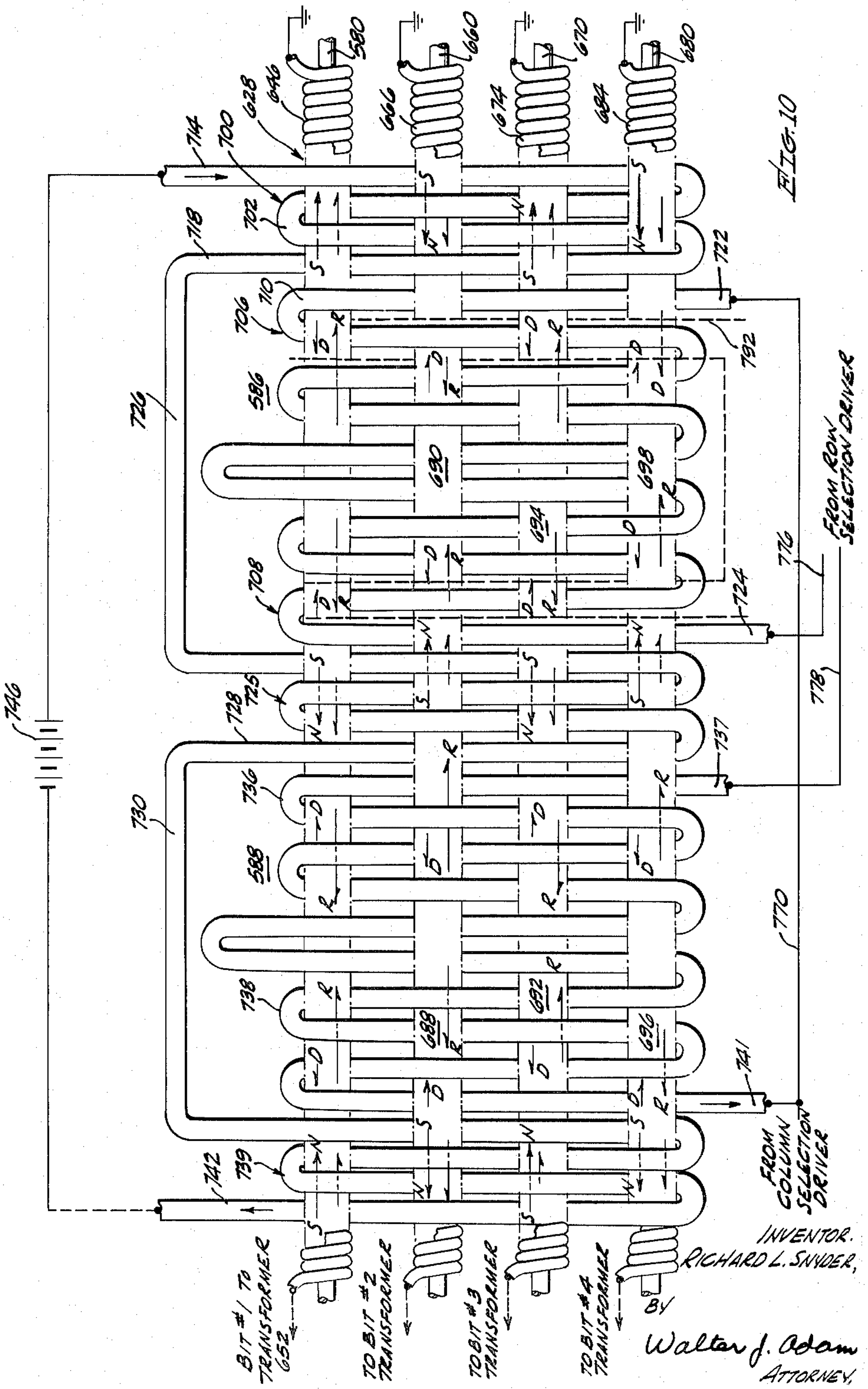

FIG. 10 is a schematic side view of the memory array of FIG. 8 taken at lines 10—10.

Referring first to the memory system of FIG. 1, a magnetic medium or wire 10 which may be a ferro magnetic wire is provided for establishing a pair of magnetic domains of opposite polarity therein so as to form a memory element 11. Domain forming coils 12 and 14 are wound around the wire 10 separated by a selected distance and connected at first ends in series by a lead 13 and at second ends to a D.C. (direct current) source such as a battery 17 by leads 18 and 20. The domain forming coils 12 and 14 are wound in opposite directions so that magnetic fields of opposite polarity along the wire 10 are established. It is to be noted that although for convience of illustration, the coils of FIG. 1 are shown adjacent to the wire 10, they are wound around the wire for increased magnetic coupling.

Read coils 24 and 26 are wound around the magnetic wire 10 between the coils 12 and 14 and connected in series by a lead 25 with the coil 26 wound in an opposite direction from the coil 24, changing direction at a center position 32. One end of each of the read coils 24 and 26 is connected to a source of read pulses or read pulse generator 27 by respective leads 28 and 30. Also wound around the wire 10 are detent coils 34 and 36 connected together by a lead 35 and in series with a D.C. source such as a battery 38 by leads 40 and 42. The detent coils 34 and 36 are wound in opposite directions and positioned adjacent to the respective domain forming coils 12 and 14 at a distance from the center position 32.

A sense and control coil or digit coil 46 is wound around the wire 10 substantially equally positioned on both sides of the center position 32 along the wire 10. One end of the coil 46 is coupled to ground and the other end is coupled through a lead 47 to one end of a first winding 48 of a transformer 49, the other end being coupled through an impedance coil 50 to ground. The coil 50 provides an impedance matched to that of the digit coil 46 for writing information therein. A second winding 51 of the transformer 49 is coupled to a sense amplifier 52. The signals developed by the sense amplifier 52 are applied through a lead 53 to an "and" gate 54. A strobe forming circuit 55 includes a delay circuit 56 coupled to the read pulse generator 27 by a lead 57 for responding to a read pulse of a waveform 58 and applying a delayed signal to a differentiating circuit 59 which in turn applies a strobe signal through a lead 60 to the gate 54. In response to a coincidence of a sensed signal on the lead 53 and a strobe signal, the gate 54 applies an informational output signal through a lead 61 to a utilization device such as a computer system (not shown).

A source of write pulses 62 applies pulses of a waveform 63 having a selected polarity representative of a binary "0" or "1" through a lead 64 to a center tap of the winding 48 to allow current to flow through the sense and control coil 46 in the selected direction. For synchronizing the reading and writing operation, a clock 64 applies a clock signal $C_1$ through a lead 65 to the read pulse generator 27 and a clock signal $C_2$ through a lead 66 to the source of write pulses 62.

Figure 2:
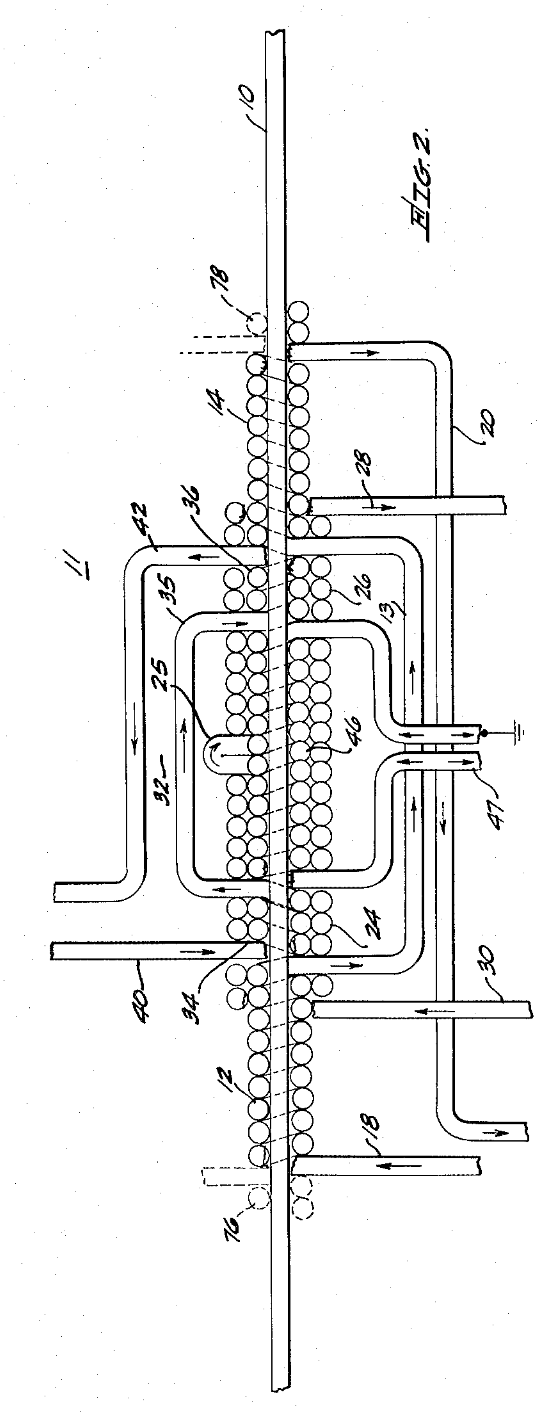
FIG. 2 is a schematic partially sectional drawing of one arrangement of the memory element of FIG. 1.
Figure 3:
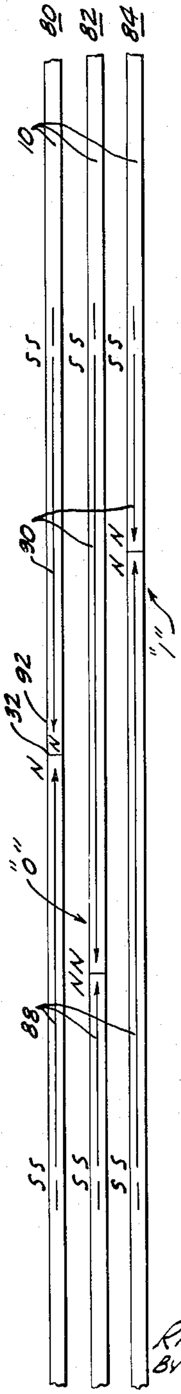
FIG. 3 is a schematic diagram of the magnetic domains and wall therebetween of the memory elements of FIGS. 1 and 2 for further explaining the operation thereof.

Before further explaining the operation of the memory element, the structure in accordance with the invention will be further shown by referring to the partially sectional drawing of FIG. 2. The wire 10 may be a continuous piece of ferromagnetic wire and may, for example, be 0.001 inch in diameter. It has been found that a wire of a nickel iron alloy having a nickel content between 50 and 80 percent is satisfactory to establish the required domains (FIG. 3). Also, when the wire 10 has nonuniform magnetic characteristics, the wire 10 may be retained under a tension to more reliably establish the moving domain wall. The domain forming coils 12 and 14 are wound closely adjacent to the wire 10 in opposite directions from each other, changing direction at the lead 13. Also in accordance with the invention, the coils 12 and 14 may be wound in the same direction and connected so that opposite magnetic fields and polarity of magnetization are developed thereby. Inward from the domain forming coils 12 and 14, the detent coils 34 and 36 are wound closely adjacent to the magnetic wire 10 being coupled in series by the lead 35 and respectively wound in opposite directions around the wire 10. Also, it is to be noted that the coils 34 and 36 may be wound in the same direction and appropriately connected so that fields of magnetizing force are developed opposite to that of the respective domain forming coils 12 and 14.

The sense and control or digit coil 46 is wound closely around the wire 10 to fill the space between the detent coils 34 and 36 on both sides of the center position 32. The read driver coils 24 and 26 are wound around the sense and control coil 46 and the detent coils 34 and 36. The read driver coil 24 is wound in a direction opposite to the domain forming coil 12 and the read driver coil 26 is wound in a direction opposite to that of the coil 14, changing direction at the lead 25. The coils may be formed from any suitable insulated conducting material such as number 42 insulated copper wire. The direction of current flow in the leads of the element of FIG. 2 shown by arrows will be further explained relative to the operation of the memory element 11.

Adjacent to the segment of the wire 10 described above may be other segments forming part of similar memory elements having similar coils, such as detent coils 76 and 78 for storing other binary bits of information. It is to be noted, as will be seen hereinafter, that the domain forming coils 12 and 14 are common to adjacent memory elements such as elements 72 and 11 and elements 11 and 72.

Referring now to FIG. 3, the wire 10 is shown containing three magnetic conditions 80, 82 and 84. The domain forming coils 12 and 14 pass sufficient current to insure that the wire 10 is at all times magnetized in the desired direction. At condition 80, domains 88 and 90 formed by the domain forming coils 12 and 14 of opposite polarity have a domain wall 92 substantially at the center or neutral position 32. The arrows 88 and 90 represent the polarity of magnetization of the magnetic material of the wire 10 with the north poles at the wall 92. It is to be noted that in accordance with the principles of the invention, the domains 88 and 90 may be developed in the reverse direction so that the south poles are at the wall 92. At the condition 80 the domains 88 and 90 are of the same length and no information is stored therein such as after a reading operation.

At the condition 82, a binary "0," for example, is stored in the wire 10 as a result of the write coil 46 responding to current in a selected direction to develop a magnetizing force to move the domain wall 92 to the left so as to expand the domain 90 and compress the domain 88. As will be explained subsequently, this "0" condition is maintained during writing into other memory elements in a memory array by the detent coil 34 which has a field of force opposing that of the domain forming coil 12. The condition 84 shows a binary "1" stored in the wire 10 as a result of the sense and control or digit coil 46 forcing the domain wall 92 to the right from the neutral position 32 where it is reliably retained by the field of the detent coil 36. Thus, the domain 88 expands and the domain 90 is compressed when a "1" is written into the magnetic wire 10 of the memory element 11. It is to be noted that a domain of a similar polarity to that of the domain 88 is established in the wire 10 in the element 72 by the coil 12 and a domain of a similar polarity to that of the domain 90 is established in the element 74 by the coil 14.

The domain forming coils 12 and 14 of FIG. 1 carry sufficient current to insure that the ferromagnetic wire 10 adjacent thereto is at all times magnetized in one direction to form the condition of magnetization shown in FIG. 3. Current in the detent coils is adjusted to produce less magneto-motive force shown by arrows 85 and 87 in FIG. 1 than in the domain forming coils shown by arrows 103 and 105 and of a value so as to not destroy a state of magnetization passing therethrough. A domain wall can only extend to the inner edge of a domain forming coil such as 12 because the coil 12 produces sufficient magnetizing force to always maintain a domain in one direction. The only force great enough to move the domain wall 92 from a position at the edge of the detent coil 34 or 36 is that generated by passing relatively large currents through the read coils 24 and 26 which are arranged in opposition to develop magnetizing forces shown by arrows 100 and 101. Current is passed through the read coils in such a direction that the magnetizing force of the read coil 24 shown by the arrow 100 aids that of the domain forming coil 12 shown by the arrow 103 and the magnetizing force of the read coil 26 shown by the arrow 101 aids that of the domain forming coil 14 shown by an arrow 105. The magnetizing forces of the read coils 24 and 26 when energized is such that the fields in respecitve detent coils 24 and 26 are overcome to cause one domain to grow in length at the expense of the other as discussed above.

Figure 4:
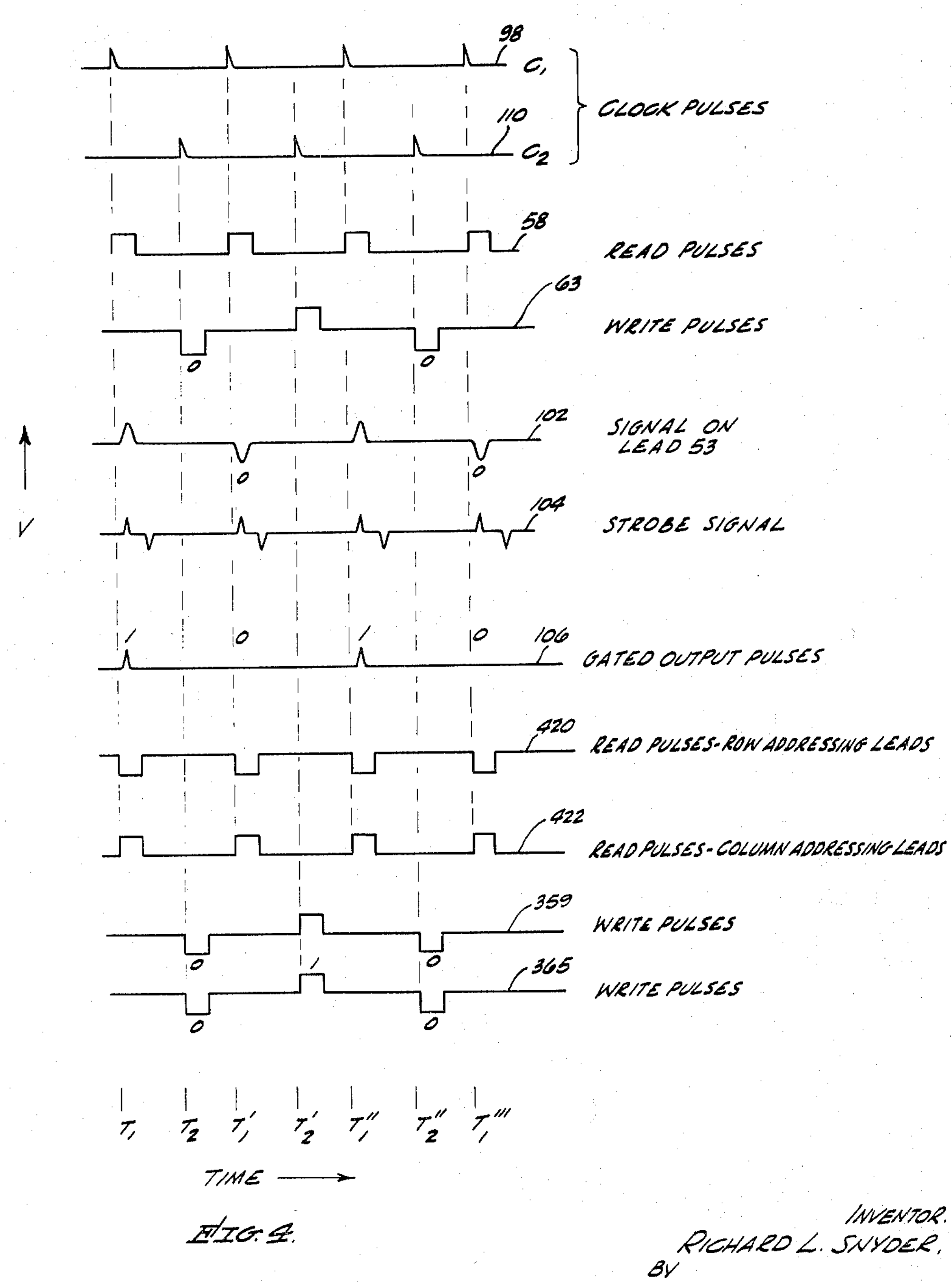
FIG. 4 is a schematic diagram showing waveforms of voltage versus time for explaining the operation of the memory element of FIG. 1 as well as the memory arrays in accordance with the invention.

For further explaining the operation of the system of FIG. 1 including the memory element 11, a clock pulse $C_1$ of a waveform 98 of FIG. 4 is applied from the clock 64 at a time $T_1$ to the read pulse generator 27 which in turn develops a read pulse of the waveform 58. Prior to the time of reading, the domain wall 92 is maintained at the condition 82 or 84 of FIG. 3 representing either a binary "0" or a "1." The read coils 24 and 26 develop the magnetizing force shown by arrows 100 and 101 to move the domain wall 92 to the neutral position of condition 80 of FIG. 3. Assuming a "1" of the condition 84 is stored in the wire 10, a positive signal similar to a waveform 102 is sensed by the coil 46, amplified and applied to the lead 53 as the waveform 102 shortly after time $T_1$ as the domain wall 92 moves past the read coil 46 to the neutral position. The read pulse of the waveform 58 at time $T_1$ is also applied to the strobe circuit 55 where it is delayed and differentiated to form a strobe signal of a waveform 104 which is applied through the lead 60 to the "and" gate 54. In response to the coincidence of the positive strobe pulse of the waveform 104 and the positive sensed signal of the waveform 102 an output signal of a waveform 106 is applied to the output lead 61. As will be discussed subsequently, the polarity of the sensed signal of the waveform 102 is opposite for a stored "0" as the domain wall 42 moved past the field of the digit coil 46 in an opposite direction.

At time $T_2$, the clock 64 applies a clock pulse $C_2$ of a waveform 110 through the lead 66 to the source of write pulses 62 which responds to develop a selected informational pulse of the waveform 63. The negative pulse of the waveform 63 which may represent a "0" is applied through the transformer 49 to the lead 47 to allow a current pulse to flow from ground to the lead 47. Thus, the domain wall 92 moves from the neutral position to a position adjacent to the domain forming coil 12 where it is reliably retained by the magnetizing force of the detent coil 36 shown by the arrow 85.

At time $T_1'$, the two cycle clock 64 applies a clock signal $C_1$ of the waveform 98 to the read pulse generator 27 which applies a read pulse of the waveform 58 to the read coils 24 and 26 and the domain wall 92 is again moved to the center position 32 as shown by the condition 80 of FIG. 3. As the wall 92 passes through the field of the digit coil 46, a negative pulse similar to the waveform 102 is sensed and applied to the lead 53 with an amplitude shown by the waveform 102 and applied to the "and" gate 54. Because of the absence of a coincidence of positive signals when the strobe signal of the waveform 104 is applied to the "and" gate 54 shortly after time $T_1'$, a signal is not passed to the output lead 61 as shown by the waveform 106, which condition represents a zero being read from the element 11. It is to be noted that the invention is not limited to selecting the output signal on the lead 61 to represent a "one" in the presence of a signal and a "zero" in the absence of a signal but other arrangements may be utilized. Also, as will be discussed subsequently, because a signal of the waveform 102 is always read out of the element 11, the system of the invention provides a highly reliable arrangement for error checking.

At time $T_2'$ in response to the clock signal $C_2$ of the waveform 110, a positive write pulse of the waveform 63 representing a "1" is applied to the digit winding 46 and current flows from the lead 47 to ground to form a field or magnetizing force to shift the domain wall 92 from the neutral position to a position adjacent to the domain forming coil 14 as shown by the condition 84 of FIG. 3 where it is reliably retained by the detent coil 36. At time $T_1''$ in response to a read pulse of the waveform 58 a positive signal of the waveform 102 is sensed and shortly thereafter in response to a positive strobe signal of the waveform 104, a signal of the waveform 106 representing a "one" is applied through the "and" gate 54 to the output lead 61. Similar to the discussion above, a "zero" may be written into the element 11 at time $T_2''$ and read therefrom at time $T_1'''$. Thus, the system of FIG. 1 operates in a highly reliable manner to develop an output signal of a first polarity for a stored "zero" and of a second polarity for a stored "one." It is to be noted that the storage element 11 presents a constant impedance to the source of write pulse 62 and the read pulse generator 27 regardless of the binary state stored therein.

In operation it has been found that when the wire 10 is a ferromagnetic wire of 0.001 inch in diameter and the sense and control coil 46 includes 16 turns of number 42 wire, a read current of 200 milli-amperes applied through the read coils 24 and 26 of 14 turns each develops an output signal on the lead 47 of approximately 15 milli-volts. For this operation, approximately 20 milli-amperes of current were applied to the digit coil 46 during writing, 10 milli-amperes of current were maintained in the domain forming coils 12 and 14 of 10 turns each and 10 milli-amperes of current were maintained in the detent coils 34 and 36 of 4 turns each.

It is to be recognized that in accordance with this invention other means such as permanent magnets may be utilized for the domain forming coils 12 and 14 and the detent coils 34 and 36. For example, the permanent magnets may be formed from magnetic wire of a highly coercive alloy such as Permadure wire woven into the system.

Referring to FIGS. 5 and 5*a* a word organized memory array in accordance with this invention is shown having a capacity of four words with each word including two binary bits. A first word line includes memory elements 114 and 116, a second word line includes memory elements 120 and 122, a third word line includes memory elements 126 and 128 and a fourth word line includes memory element 132 and 134. It is to be noted that for convenience of illustration four words of two binary bits each are shown in the array but the principles of the invention are equally applicable to a memory of any desired capacity. The element 114 includes read coils 138 and 140 wound in opposite directions around a magnetic medium or wire 142 and coupled in series with one end of the coil 138 coupled through a diode 144 to a row addressing or X lead 148. The end of the coil 140 opposite to the coil 138 is connected to one end of a read coil 150 of the element 116 which in turn is coupled to a read coil 152, with the coils 150 and 152 wound in opposite directions around the magnetic wire 142 and with the read coils 140 and 150 wound in the same direction. The end of the coil 152 opposite to the coil 150 is connected to a column addressing lead or Y lead 156. The elements 114 and 116 also respectively include sense and control or digit coils 160 and 162 wound around the core wire 142 so as to be magnetically coupled thereto and respectively centered between the read coils 138 and 140 and the read coils 150 and 152.

For establishing the states of magnetization in the wire 142, a domain forming coil is provided between each memory element 114 and 116 and at the ends thereof. A domain forming coil 164 is wound around the core wire 142 above the read winding 138, a domain forming coil 166 is positioned around the core wire 142 between the read coils 140 and 150 and a domain forming coil 168 is wound around the magnetic wire 142 below the read coil 152. If additional memory elements are utilized, a single domain forming coil may be provided between each two adjacent memory element. The domain forming coils 164, 166 and 168 which are wound in a similar direction are coupled together so that current passes through adjacent ones in opposite directions as will be explained subsequently.

The memory element 114 also includes detent coils 170 and 172 wound around the magnetic wire 142 respectively adjacent to the domain forming coils 164 and 166. Detent coils 176 and 178 of the memory element 116 are wound around the magnetic wire 142 respectively adjacent to the domain forming coils 166 and 168. The detent coils 170, 172, 176 and 178 which are wound in a similar direction around the core wire 142 are connected in series so that the two in each element develop opposite magnetizing forces and the two detent coils on each side of a domain forming coil develop magnetizing forces in the same direction.

The coils and wires of the memory elements 120 and 122, 126 and 128 and 132 and 134 of the other word columns are similar to the elements 114 and 116 and will not be explained in detail. Respective portions of the elements 120 and 122, the elements 126 and 128 and the elements 132 and 134 have reference characters similar to the elements 114 and 116 except with subscripts *a, b* and *c*. A diode 150 is coupled between the rear coil 138*a* of the element 120 and the row addressing lead 148, a diode 182 is coupled between the read coil 138*b* of the element 126 and a row addressing lead 183 and a diode 184 is coupled between the read coil 138*c* of the element 132 and the row addressing lead 183. The read coils 152*a* and 152*c* are coupled to a Y or column addressing lead 188 and the read coil 152*b* is coupled to the column addressing lead 156.

A source of direct current such as a battery 200 provides a series path from a positive terminal through the domain forming coils 164*a*, 164, 166, 166*a*, 168*a*, 168, 168*b*, 168*c*, 166*c*, 166*b*, 164*b*, 164*c* and to a negative terminal of the battery 200. A source of direct current such as a battery 204 provides a series path from a positive terminal through detent coils 178*b*, 176*b*, 172*b*, 170*b*, 178*c*, 176*c*, 172*c*, 170*c*, 178*a*, 176*a*, 172*a*, 170*a*, 178, 176, 172 and 170 to a negative terminal of the battery 204. It is to be noted that other arrangements may be utilized to interconnect the domain forming coils and the detent coils within the principles of the invention as long as the required relative polarity and magnitude relations are maintained.

A winding 206 of a sense and control transformer 208 responding to the first bit which may be the most significant bit of a selected word or of a character of a selected word has one end coupled through the sense coils 160*a* and 160 to ground and the other end coupled through the sense coils 160*c* and 160*b* to ground. A winding 210 of a sense and control transformer 212 responding to the second bit which may be the second most significant bit of a character of a selected word has one end coupled through the sense coils 162*a* and 162 to ground and a second end coupled through the sense coils 162*c* and 162*b* to ground.

The address and read driver system includes a read pulse generator 214 responding through a lead 218 to a clock 220 for applying negative pulses to a desired positively biased row addressing lead and a positive pulse to a desired negative biased column addressing lead. An address and read driver 222 which may be a transformer has a first coil 224 coupled through a lead 226 to the read pulse generator 214 with the other end coupled to ground and includes a second winding 228 having one end coupled to a positive voltage terminal 230 and the other end coupled to the row addressing lead 148. A second address and read driver 234 which may be a transformer has a first winding coupled from ground through a lead 236 to the read pulse generator 214 and a second winding coupled from a positive terminal 238 to the row addressing lead 183. For selection in the Y direction an address and read driver 242 shown as a transformer has a first winding 244 coupled from ground through a lead 246 to the read pulse generator 214. A second winding 245 of the driver 242 has one end coupled to a negative voltage terminal 247 and the other end coupled to the column address lead 156. An address and read driver 248 has a first winding 250 coupled from ground through a lead 252 to the read pulse generator 214 and a winding 254 coupled from a negative terminal 258 to the column address lead 188. Thus, a row address lead 148 or 183 is selected in response to a pulse of a waveform 256 or 258 applied on respective leads 226 or 236 to the address read driver 222 or 234. Simultaneously, a column address lead 156 or 188 is selected by a pulse of a waveform 262 or 264 applied through respective leads 246 or 252 to address and read drivers 242 or 248. Thus, a negative pulse is applied to the row address lead and a positive pulse is applied to the column address lead. The bias potentials applied to the row and column drivers are of such polarity that in the absence of a signal the diodes connected in the word lines are biased in the non-conducting direction. Application of one pulse does not overcome this bias. Application of both pulses such as in the leads 148 and 156 overcomes the bias in the diode such as 144 of the word line coupling the two active busses. The amplitude of the pulses is chosen to be large enough to make the conduction current equal to that required to develop satisfactory read fields.

During reading, signals from the elements of the selected word column are sensed and applied to the coils 206 and 210 of the sense amplifiers 208 and 212. The sense and control transformer 208 includes a second winding 268 having one end coupled to ground and the other end coupled to the base of a p-n-p transistor 270 which constitutes the sense amplifier and is included in a gating circuit 272. The transistor 270 has an emitter coupled through a resistor 276 to a positive voltage terminal 278 and a collector coupled through a winding 280 of a transformer 284 to ground. A winding 286 of the transformer 284 has one end coupled to ground and a second end coupled to an "and" gate 290 which responds also to a strobe signal applied through a lead 292 from a strobe circuit 296. The strobe circuit 296 similar to the strobe circuit 59 of FIG. 1 responds to a read pulse through a lead 298, as previously discussed, so that in response to the coincidence of a positive signal from the coil 286 and a positive strobe signal from the lead 292, the "and" gate 290 applies an output signal to the lead 300 which may be coupled to a computer system, for example. A winding 302 of the transformer 284 having a grounded center tap is coupled at opposite ends through diodes 304 and 306 to an inhibit gate 310. A strobe signal is also applied to the inhibit gate 310 on the lead 292 so that in response to the absence of a signal in the winding 302 an error signal is applied through a lead 312 to an error flip flop 314. Thus, in accordance with the invention the positive or negative signals, one being always obtained from each selected element during reading, provides an error indication in the absence of an output signal. It is to be noted that the "and" gate 290 applies a signal to the lead 300 which may represent a "one" condition with the absence of a signal representing the "zero" condition. A gating circuit 318 similar to the circuit 272 is coupled through a winding 320 of the sense amplifier 212 to ground. In response to a strobe signal 292 the gating circuit 318 applies an informational signal to a second output lead 324 and a signal through a lead 323 to the flip flop 314.

For writing information into the memory elements, the sense coils are utilized without requiring operation of the row and column addressing system. A write pulse generator 326 responding to a clock signal through a lead 327 applies positive pulses of a waveform 328 through a lead 329 to a pulse forming circuit 330. The signal of the waveform 328 is applied through a differentiating circuit 331 to form a signal of a waveform 332, the positive portion of which is applied through a diode 333 to a display bit register or flip flop 334. A second input lead of the flip flop 334 responds to an "or" gate 335 being responsive to signals from either of "and" gates 336 and 337. For re-circulation, a read output source 338 which may receive signals from the output leads 300 and 324 applies signals to the "and" gate 386 which in coincidence with a re-record signal on a lead 339 from the computer system, for example, sets the flip flop 334 to a first state. The "and" gate 337 also responds to an input signal applied on a lead 340 from the computer system in coincidence with a new input signal on a lead 341, which is a control signal received from the computer system, to apply a signal through the "or" gate 335 to set the flip flop 334 to a second state. The positive and negative signals developed by the flip flop 334 are respectively applied to the bases of p-n-p type transistors 342 and 343 having emitters coupled to the lead 329 for being biased during a pulse of the waveform 328 to respond to a negative signal applied to the bases of one or the other from the flip flop 334. The collector of the transistor 342 applies a signal through a resistor 344 to the base of an n-p-n type transistor 345, the emitter thereof being coupled to ground. The collector of the transistor 342 is also coupled through a resistor 346 to a negative terminal 347 and the base of the transistor 345 is coupled through a resistor 348 to a positive voltage terminal 349. Signals are applied from the collector of the transistor 345 to the base of a p-n-p type transistor 350 having an emitter coupled to a positive voltage terminal 351 and a collector coupled to a lead 353. The base of the transistor 350 is also coupled to the terminal 351 through a biasing resistor 354. The collector of the transistor 343 is coupled to the base of an n-p-n type transistor 355 having an emitter coupled to a negative voltage terminal 356 and a collector coupled to the lead 353. The base of the transistor 355 is also coupled to the terminal 356 through a biasing resistor 357. Thus, in response to a negative signal applied to the transistor 343 or 342 in coincidence with the pulse of the waveform 328, either the transistor 355 or 350 is biased into conduction to apply a negative or a positive pulse to the lead 353 as shown by a waveform 359. The pulses of the waveform 359 representing a "0" or a "1" are applied through the lead 353 to a center tap of the winding 210. In response to the selected pulse on the lead 353 information is written into the first bit of the word line read during the previous cycle. It is to be noted that the application of these pulses to the transformer center tap does not generate appreciable disturbance in the sense amplifier because the digit coils coupled to each half of the winding 206 have equal impedances.

For writing binary information into the second binary bits of the word lines, a pulse forming circuit 360 is provided similar to the pulse forming circuit 330. The pulse forming circuit 360 responds to a pulse applied from the lead 329 and during re-circulation to a read output signal and a re-record signal through leads 361 and 362. Also, the circuit 360 responds to an input signal from the computer and a new input control signal applied to leads 363 and 364. The informational pulses of a waveform 365 are applied through a lead 367 to a center tap of the winding 210 of the sense amplifier 212 Thus, in response to the polarity of the pulses of the waveform 365, either a "zero" or a "one" is written into the second element of the one of the four word lines that was read in the previous cycle.

Referring also to the diagram of FIG. 6 of the magnetic wire 142, the domain forming coil 164 develops a directional magnetizing force indicated by an arrow 396 and a polarity of magnetization indicated by an arrow 397. The magnetic force shown by tipped arrows such as 396 produces a magnetization in the magnetic wire in the same direction as indicated by the solid tipped arrow such as 397 with north and south poles. The detent coil 170 develops a magnetizing force indicated by a directional arrow 398. On the other side of the domain wall region of the element 114 the detent coil 172 develops a force indicated by an arrow 400, the domain forming coil 166 develops a magnetizing force indicated by an arrow 402 and the detent coil 176 develops a force indicated by an arrow 404. The domain forming coil 160 develops a polarity of magnetization shown by an arrow 405. On the other side of the domain wall region of the element 116, the detent coil 178 develops a magnetizing force indicated by a directional arrow 408 and the domain forming coil 168 develops a force indicated by a directional arrow 412 having a polarity of magnetization shown by an arrow 413. A directional arrow 416 indicates the magnetizing force of the detent region for an additional element or bit of the word. Thus, between each memory element a single domain forming coil is utilized, each adjacent domain forming coil developing a domain region with an opposite magnetic polarity. The detent coils on both sides of each forming coil develop a magnetizing force in the same direction with the direction changing at each adjacent domain forming coil. The directions of magnetizing forces of adjacent read coils reverse with the polarity relations of the domains as shown by arrows 399 and 401 and arrows 403 and 407 and the forces are in the same direction for two adjacent read coils in different elements. The domain wall of the element 114, for example, has a neutral position 418 after reading in response to the forces of the arrows 399 and 401 developed by the read coils 430 and 432 and positions 420 or 422 within the field of the detent coils when a "zero" or a "one" is written therein. When the domain wall is in the position such as 420, the additional force of the detent coil 170 provides a stable position unaffected by relatively small currents passing through digit coils during writing. It is to be noted that the positions representing a "zero" or a "one" are reversed in adjacent elements such as 116.

Referring now to FIG. 5 and the waveforms of FIG. 4, the operation of the memory array will be explained in further detail. At time $T_1$, a negative read pulse of a waveform 420 is applied to a row addressing lead such as 148 in response to a pulse of the waveform 256 applied from the read pulse generator 214 to the address and read driver 222. Simultaneously, a positive pulse of a waveform 422 is applied to a column addressing lead such as 156 in response to a pulse of the waveform 262 applied from the read pulse generator 214 to the address and read driver 242. Thus, a pulse of current passes through the read coils 152, 150, 140 and 138 of the elements 114 and 116 and through the diode 144. At the same time the other diodes 150, 182 and 184 are maintained substantially nonconductive. Assuming a "one" is stored in the element 114, a positive signal similar to that of the waveform 102 is developed in the sense coil 160 and applied to the coils 206 and 268 of the sense and control transformer 208. Thus, the transistor 270 applies a positive signal to the transformer 284 and to the "and" gate 209. Shortly after time $T_1$, a strobe signal similar to the waveform 104 is applied to the gate 290 and an output signal similar to the waveform 106 is applied to the output lead 300. Because of the presence of a sensed signal, the inhibit gate 310 does not pass a signal to the error flap-flop 314. In a similar manner and simultaneously, a signal which may be either positive or negative representing a "0" or a "1" is sensed by the sense coil 162 and applied to the transformer 212, the gating circuit 318 and to the output lead 324 as either the absence or presence of a signal.

At time $T_2$ which is the beginning of the writing cycle, write pulses of the waveforms 359 and 365 are respectively applied to the leads 353 and 367. The negative pulse representing a "zero" is applied to the winding 206 and to the digit coils 160 and 160*a* and to the digit coils 160*c* and 160*b*. Because only the element 114 of the first bit positions has the wall in a neutral position from being read at time $T_1$, only that element is affected by the writing pulse. The action of the detent coils prevents the domain walls of other elements from moving during writing. Thus, the domain wall 92 of the element 114 is moved to a position such as 420 of FIG. 6 representing a "zero." The negative pulse of the waveform 365 applied to the winding 210 in a similar manner moves the domain wall of the element 116 to a "zero" position therein, while not affecting the information stored in the elements 122, 128 and 134. It is to be noted that any desired combination of "zeros" and "ones" may be written into a word line.

At time $T_1'$ which is the beginning of a read cycle, the negative pulse of the waveform 420 is applied to a selected row addressing lead such as 183 and a positive pulse of a waveform 422 is applied to a selected column addressing lead such as 188. Thus, the diode 184 is biased into conduction and current passing through the read coils 152c, 150c, 140c and 138c moves the domain walls to neutral positions similar to 418 and 419 (FIG. 6) in the elements 132 and 134. Thus, at time $T_1'$ output signals, which may be "zeros" similar to the negative signal of the waveform 102, are developed in the sense coils 160c and 162c and respectively applied to the windings 206 and 210. Thus, a negative signal is applied to the transistor 270 and an amplified negative signal similar to that of the waveform 102 is applied to the "and" gate 290 as well as to the inhibit gate 310. Shortly after time $T_1'$ a stroke signal similar to the waveform 104 is applied to the "and" gate 290 and because the informational signal is negative, a signal is not applied to the output lead 300, which condition represents a "zero" to the system. At the same time the strobe signal is applied to the inhibit gate 310 and because of the presence of a sensed signal, the error flip flop 314 is not triggered. In a similar manner the sequence continues writing at time $T_2'$ into the elements 132 and 134.

At time $T_1''$ a word is selected to be read in a similar manner by the pulses of the waveforms 420 and 422 and a "one" signal, for example, is sensed by the two appropriate digit coils and applied to the output leads 320 and 324.

Also, in a manner similar to that discussed above, "zeros" may be written at time $T_2''$ into the elements which were read at $T_1''$ and a word again selected and read at $T_1'''$. Therefore, during reading the selected word is addressed and during writing the binary information is applied to the sense coils without addressing the matrix. Because of the action of the detent coils, only that element is written into that has been read at the previous ime period.

In the system of FIG. 5 separate detent forming means or coils have been shown in each memory element. A further arrangement in accordance with the invention shown in FIG. 7 functions without separate detent coils wound on the magnetic storage wire and provides a mode of addressing without diode switches in each word line. The system for convenience of illustration includes 4 words each including two binary bits. Included in the first word column are elements 424 and 426, in the second word column elements 428 and 431, in the third word column elements 433 and 435 and in the fourth word column, elements 437 and 439. Referring to the elements 424 and 426, read coils 430 and 432 of the element 424 and read coils 434 and 436 of the element 426 are coupled in series between an X or row addressing lead 440 and a Y or column addressing lead 442, the read coils being wound around a magnetic medium or wire 444 in a manner similar to that discussed relative to FIG. 5. A sense and control or digit coil 446 is wound around the magnetic wire 444 at a position adjacent to the connection of the two read coils 430 and 432 and a sense and control or digit coil 448 is wound around the magnetic wire 444 at a position adjacent to the connection between the two read coils 434 and 436. Domain forming coils 452, 454 and 456 are wound around the magnetic wire 444 respectively adjacent to the end of the read coil 430 coupled to the row addressing lead 440, adjacent to the read coils 432 and 434 and adjacent to the end of the read coil 436 coupled to the column addressing lead 442. Because the coils of the other word columns are similar to the memory elements 424 and 426 as discussed above, the coils of the memory elements 428 and 430, the elements 432 and 434 and the elements 436 and 438 have similar reference characters except with respective subscripts *a*, *b* and *c*. The read coil 430*a* is coupled to the row addressing lead 440 and the read coil 436*a* is coupled to a Y or column addressing lead 458. Read coils 430*b* and 430*c* are coupled to a row addressing lead 460 and read coils 436*b* and 436*c* are respectively coupled to the column addressing leads 442 and 458.

The domain forming coils are interconnected in a manner similar to FIG. 5 to provide a D.C. current therethrough from a source of potential such as a battery 464. A sense and control transformer 466 has a winding 468 with a first end coupled through sense coils 446*a* and 446 to ground and a second end coupled through sense coils 446*c* and 446*b* to ground. A sense and control transformer 472 has a winding 474 with a first end coupled through the digit coils 448*a* and 448 to ground and a second end coupled through sense or digit coils 448*c* and 448*b* to ground for writing and sensing signals in the second bits or elements 426, 431, 435 and 439 of the memory. The sense amplifiers 466 and 472 respectively have second windings 478 and 480 with one end coupled to ground and the other end coupled to respective leads 482 and 484 which may apply positive and negative informational signals to amplifying and gating circuits such as 272 of FIG. 5*a* and to inhibit gates for error checking.

A source of write pulses 488 which may be similar to the pulse generator 326 and the pulse forming circuit 330 of FIG. 5 is provided for responding to clock signals $C_2$ on a lead 490 to develop binary write pulses similar to those of waveforms 359 and 365 of FIG. 5*a* on leads 498 and 500 which are respectively coupled to center taps of the windings 468 and 474.

The read address system which also provides the detent action to the system includes a read pulse generator 502 responsive to a clock signal $C_1$ on a lead 504. For energizing the row addressing lead 440, a pulse of a waveform 506 is applied from the read pulse generator 502 through a lead 508 to the base of an n-p-n type transistor 512. The emitter of the transistor 512 is coupled to a negative voltage terminal 514 and the collector is coupled to the lead 440 as well as through a resistor 518 to a positive voltage terminal 520 to provide a detent current. For energizing the row addressing lead 460, a pulse similar to the waveform 506 is applied from the read pulse generator 502 through a lead 524 to the base of an n-p-n type transistor 526. The emitter of the transistor 526 is coupled to a negative voltage terminal 528 and the collector is coupled both to the row addressing lead 460 and through a resistor 530 to the terminal 520. For energizing the column addressing lead 442, a pulse of a waveform 532 is applied from the read pulse generator 502 through a lead 534 to the base of a p-n-n type transistor 536. The emitter of the transistor 536 is coupled to a positive voltage terminal 540 and the collector is coupled to the lead 442 as well as through a resistor 544 to a negative voltage terminal 546. Also for energizing the column addressing lead 458, a pulse similar to the waveform 532 is applied from the read pulse generator 502 through a lead 548 to the base of a p-n-p type transistor 550. The emitter of the transistor 550 is coupled to a positive voltage terminal 554 and the collector is coupled to the lead 458 as well as through a resistor 558 to the terminal 546.

In the static condition, direct current flows from the terminal 520 through the leads 440 and 460 and through the read coils of each of the elements to the leads 442 and 458 and to the negative terminal 546. This bias or detent current indicated by waveforms 559 and 561 is established by the resistors 518, 530, 544 and 558 to have a value such that a detent action or trapping of the domain walls is provided but no domain wall shifting is performed. Because the read coils in each element reverse direction with the read coils such as 432 and 434 of two adjacent elements wound in the same direction, the magnitizing forces developed by the read coils are similar to the arrows 399, 401, 403 and 407 of FIG. 6 and the magnetizing forces developed by the detent current in the read coils are similar to the forces represented by the arrows 398, 400, 404 and 408 of FIG. 6. It is to be noted that the forces developed for the detent action are in a similar direction at both ends of a domain forming coil.

During reading at time $T_1$ (FIG. 4) a negative pulse of the waveform 559 is applied to the row addressing lead 440 as the transistor 512 is biased into conduction in response to a pulse of the waveform 506. The current through the read coils coupled to the lead 440 in response to the negative voltage pulse of the waveform 559 is effectively two times the bias current except flowing the opposite direction into the terminal 514. Thus, the resulting current is effectively a half current in the read direction for the elements 424, 426, 428 and 431 which is insufficient to move the domain walls in those elements. The detent current in the elements 433, 435, 437 and 439 is unaffected. Also at time $T_1$, a positive read pulse of the waveform 561 is applied to a selected column addressing lead 442 from the positive terminal 540 in response to a waveform 532 biasing the transistor 536 into conduction. The current resulting from the positive pulse of the waveform 561 is also of a value two times the bias or detent current but in the opposite direction. Thus, sufficient current for reading, that is, moving the domain wall to the neutral position, flows through only the read coils of the elements 424 and 426. The current flowing through the read coils of the elements 424 and 426 is approximately three times the detent current and in the opposite direction. Current flowing through the elements 433 and 435 is only a half current because the transistor 526 is not selected. As the domain walls move to the neutral position at time $T_1$ in the elements 424 and 426 positive signals similar to the waveform 102 representing stored binary ones, for example, are applied to the transformers 466 and 472 and to the output leads 482 and 484 as positive signals.

At the termination of the read pulses of the waveforms 559 and 561, the detent current is restored in all elements. At time $T_2$ in response to write pulses similar to the waveform 359 and 365 of FIG. 4 the digit coils are energized so that "zeros," for example, are written into the previously read elements 424 and 426. At time $T_1'$ read pulses similar to the waveforms 559 and 561 may be applied to the row selection lead 460 and the column selection lead 458, for example, and a current approximately three times the detent current flows in an opposite direction therefrom through the read coils of the elements 437 and 439. Similar to the discussion above, the other elements have only a half current flowing through the read coils. Thus, "zeros" may be read from the elements 437 and 439 as the domain wall moves to the neutral position and negative signals similar to that of the waveform 102 are applied to the leads 482 and 484. As discussed relative to FIG. 5 the gating circuits may form a signal similar to the waveform 106 where the absence of signals represents a "zero." The sequence continues in a similar manner at times $T_2'$, $T_1'$, $T_2''$ and $T_1''$ and will not be explained in further detail. It is to be understood that any binary combination of "zeros" and "ones" may be read from or written into a selected word line. It is to be again noted that the systems of FIGS. 5 and 7 are not limited to the number of elements and words illustrated but the principles of the invention are equally applicable to a memory of any desired size.

Thus, in the system of FIG. 7, the detent coils are eliminated in accordance with the invention by passing a detent current through the read coils. In the system of FIG. 7 similar to that of FIG. 5 an addressing operation is performed only during reading. Also similar to the system of FIG. 5, the driving impedance is constant during reading because the read coils have a constant impedance regardless of the information stored therein. In the mode of addressing of FIG. 7, diode switches are eliminated as well as coincidence currents in the magnetic storage element.

Because in FIG. 7 the detent force is developed in the read coils which extend into the domain wall region, the force thereof substantially aids the force of the digit coils during writing for additional speed of operation. In the arrangement of FIG. 5, the detent coil being close to the domain forming coils does not provide this additional force in the direction of domain wall movement until writing is nearly ended.

Another arrangement in accordance with this invention applicable to loom weaving is shown in the partially sectional plan view of FIG. 8 as a 16 word memory with each word including four binary bits as shown in the sectional view of FIG. 9 and the side view of FIG. 10. The memory is divided into a first and a second section respectively including magnetic wires 580 and 582 in the first bit position of the 16 words. The magnetic wire 580 is included in memory elements 586, 588, 590, 592, 594, 596, 598 and 600 and the magnetic wire 582 is included in memory elements 604, 606, 608, 610, 612, 614, 616 and 618. The magnetic wire 580 is bent in the completed array into parallel segments 628, 630, 632 and 634 and the magnetic wire 582 is bent in the completed array into parallel segments 638, 640, 642 and 644. Sense and control or digit coils 646 and 648 are wound tightly around the respective magnetic wires 580 and 582 continuously in one direction. One end of the digit coil 646 is coupled to ground and the other end is coupled to a first end of a winding 650 of a sense and control or sense amplifier transformer 652. Also, one end of the digit coil 648 is coupled to ground and the other end is coupled to the other end of the coil 600. A lead 656 connected to a center tap of the winding 650 applies write pulses from a source of write pulses (not shown) similar to that of FIG. 5*a*. It is to be noted at this time that the sense and control transformer 652 is for reading from and writing into only the memory elements representing the first bit of each of the sixteen words. A winding 653 applies sensed signals to gating circuits similar to that of FIG. 5*a*.

Referring now to the sectional view of FIG. 9 the magnetic wires 580 and 582 are shown in section for storing the first bit of the sixteen words. The second bit of each word is stored in magnetic wires 660 and 662 respectively having sense and control or digit wires 666 and 668 wound thereon. Magnetic wires 670 and 672 respectively wound with digit coils 674 and 676 are utilized in the memory elements for storing the third bit of each word and magnetic wires 680 and 682 respectively wound with digit coils 684 and 686 are utilized in the fourth bit of each of the sixteen words.

As shown in the side view of FIG. 10, the digit coils 666, 674 and 684 are coupled to ground at one end and after passing around the respective wires 660, 670 and 680 to the other end thereof, that is, through the eight memory elements of the respective bit level, are coupled to one end of sense and control transformers for Bits No. 2, 3 and 4 similar to 652 (FIG. 8) for reading and sensing information of the respective second, third and fourth bits of the eight words. Also, one end of the digit coils 668, 676 and 686 is coupled to ground and the other end after passing through the eight memory elements of the respective bit level is coupled to the other end of the sense and control transformers of Bits No. 2, 3 and 4. The side side view of FIG. 10 shows the elements 588 and 566 of the first bit position of two words on the segment 628 of the magnetic wire 580. Also respectively of the same two words, memory elements 688 and 690 store the second bits, memory elements 692 and 694 store the third bits and memory elements 696 and 698 store the fourth bits. The memory elements 586, 690, 694 and 698 include a common domain forming coil 700 formed of a wire 702 and common read coils 706 and 708 formed of a wire 710. For convenience ox explanation of the winding of the wires 702 and 710 only the magnetic wire will be referred to but it is to be understood that the wires such as 702 and 710 pass around both the magnetic wire and the digit coil wound thereon.

A first end 714 of the wire 702 passes on a first side of the magnetic wire 580, on a second and opposite side of the magnetic wire 660, on a first side of the magnetic wire 670, on a second side of the magnetic wire 680 and around to the first side of the magnetic wire 680. The wire 702 then continues around a second side of the magnetic wire 670, around a first side of the magnetic wire 660, around a second side of the magnetic wire 580 and back around a first side of the magnetic wire 580. This sequence continues in a similar manner to an end 718.

The winding of the domain forming coil 700 may be performed by loom weaving where the magnetic wires with their sense and control coils are woven as the warp threads in a fabric in which the weft is formed of wires such as 702 and 710 of insulated copper. A bobbin containing the wire 702 is passed through the magnetic wires 580, 660, 670 and 680 continuously to form the domain forming coil 700. For this operation either a conventional loom operated by hands and feet or a fully automatic loom may be utilized. After the wire 702 is woven to the end position 718, that bobbin is set aside and a bobbin containing the wire 710 is utilized to weave the read coils 706 and 708. It is to be noted at this time that the segments of each of the magnetic wires such as segments 628, 630, 632 and 634 and segments 638, 640, 642 and 644 of FIG. 8 are in a single flat plane during weaving and are bent or folded into the positions shown in FIGS. 8 and 9 after weaving is completed.

In the next weaving operation, the wire 710 is woven from an end 722 along the second side of the magnetic wire 680, along the first side of the magnetic wire 670, along the second side of the magnetic wire 660, along the first side of the magnetic wire 580 and around the second side of the magnetic wire 580. The wire 710 then continues around the first side of the magnetic wire 660, around the second side of the magnetic wire 670, around the first side of the magnetic wire 680 and around the second side of the magnetic wire 680. The sequence continues in a similar manner until the wire 710 passes around the first side of the magnetic wire 580 at which position the wire 702 is looped and again passed back around the first side of the magnetic wire 580. Thus, effectively a stitch is dropped so as to reverse the field of force of the read coil 708 from that of the read coil 706. The wire 710 then continues around the second side of the magnetic wire 660, around the first side of the magnetic wire 670, around the second side of the magnetic wire 680 and around the first side of the magnetic wire 680. This sequence continues in a similar manner until the end 724 is reached, completing the weaving of the read coil 708.

The bobbin containing the wire 702 is then again utilized to weave a common domain forming coil 725. The wire 702 forms a lead 726 and passes around the second side of the magnetic wire 580, around the first side of the magnetic wire 660, around the second side of the magnetic wire 670, around the first side of the magnetic wire 680 and back around the second side of the magnetic wire 680. This sequence continues in a similar manner passing around the first side of the magnetic wire 580 to an end position 728.

A wire 734 which may be in another bobbin is then utilized to weave common read coils 736 and 738 of the memory elements 588, 688, 692 and 696, in a similar manner from an end 737 to end 741. A domain forming coil 739 is then woven from the wire 702 as a continuation of a lead 730 to an end position 742 having the same direction of winding as the domain forming coil 700. As shown in FIG. 8, the domain forming coils and read coils are wound in a similar manner for all 8 words of the half array having the memory elements 590, 592, 594, 596, 598 and 600 in the first bit position. The wire 702 of the domain forming coils is continuous and the end 714 is coupled to a suitable D.C. source such as the positive terminal of a battery 746 and the other end from the element 598 is coupled through a lead 743 and through the common domain forming coils of the second half of the array to the negative terminal of the battery 746. The common domain forming coils of the words having memory elements 592, 590, 594, 596, 600 and 598 in the first bit position are respectively coupled by leads 753, 755, 757, 759, 761 and 763 so that in adjacent domain forming coils of any one magnetic wire domains of opposite magnetic polarity and forces are developed. Similar to the discussion relative to FIG. 7, the digit coil 646 is wound in one direction so that a selected "0" or "one" position in adjacent memory elements is at opposite ends thereof as shown in FIG. 6. After the weaving is completed, the array being in one flat plane is bent or folded into the position shown in FIG. 8 to form the segments and a relatively compact memory. The domain forming coils of FIG. 8 are shown in a straight portion of the segments but the domain forming coils may in a compact array follow the curvature of the magnetic wire between adjacent segments. This bending also aligns the coil connection for the row and column leads in a convenient orthogonal pattern.

In a similar manner, the second half of the array is formed on the magnetic wires 582, 662, 672 and 682 and the corresponding digit coils. Utilizing similar weaving techniques, the second half of the array may be formed and folded into the position shown in FIG. 8. The memory elements of the second half of the array such as 616 and 618 are symmetrical to the memory elements of the first half of the array such as 586 and 588 relative to a central plane between the two halves. The common domain forming coils in the second half of the array formed of a wire 763 (FIG. 8) is wound and coupled together in a manner as discussed above with the common domain forming coil of the word having the memory element 616 in the first bit position coupled to the lead 743 and the common domain forming coil including the memory element 604 coupled to the negative terminal of the battery 746.

As shown in FIG. 8 the magnetic domains having polarities indicated by arrows such as 805, 807, 809 and 811 with north and south indications alternate in each adjacent domain forming coil so that the magnetic wall in the element 586 is formed at two north magnetic polarities and the magnetic wall of the element 588 is formed at two south polarities, for example. In the element 586, a magnetizing arrow 812 produces a magnetization in the same direction as indicated by the solid tipped arrow 805 representing the state of magnetization of one domain and the magnetizing force of the arrow 813 produces a magnetization of an adjacent domain in the same direction as indicated by the arrow 807. Arrows 815 and 817 including the letter D represent the magnetizing forces developed by the detent current. Also, arrows 819 and 820 including the letter R represent the magnetizing forces developed by the read coils. In the element 588, arrows 822 and 824 represent the magnetizing forces developed by the read coils and arrows 826 and 828 represent the magnetizing forces developed by the detent current. Thus, in each adjacent element of FIG. 8, the magnetizing read forces are reversed to correspond to the polarity change at the wall region of the two magnetic domains. Arrows indicating direction of magnetization and magnetizing forces in the magnetic wire 582 are shown for the elements 616 and 618 to show the similarity of the array. As shown in FIG. 10, because of the loom weaving arrangement, the polarities of magnetization of the domains at each adjacent bit level of each word line reverses. Also, the magnetizing forces of the detent current and of the read coils reverses at each adjacent bit level of each word line. The states of magnetization and the magnetizing forces follow a similar pattern in all elements and will not be explained in further detail.

For row and column selection during reading, one end of each adjacent pair of read coils of a memory element is coupled to a row addressing lead and the other end is coupled to a column addressing lead. As shown in FIG. 10 the ends 722 and 741 of the read coils 706 and 738 are coupled to a column addressing lead 770. The end 724 of the read coils 708 is coupled to a row addressing lead 776 and the end 731 of the read coil 736 is coupled to a row addressing lead 778. As shown in FIG. 8, a column addressing lead 780 is coupled to one end of a common read coil of the word including the memory elements 590 and 592, a column addressing lead 782 is coupled to one end of a common read coil of the word including the memory elements 594 and 596 and a column addressing lead 784 is coupled to one end of a common read coil of the words including the memory elements 598 and 600. Also, a column addressing lead 786 is coupled to the read coils of the word including the memory elements 604 and 606, a column addressing lead 788 is coupled to the read coils of the word including the memory elements 608 and 610, a column addressing lead 790 is coupled to the read coils of the word including the memory elements 612 and 614 and a column addressing lead 792 is coupled to a read coil of the memory elements 616 and 618.

The row addressing lead 776 is also coupled to one of the common read coils of the words including the memory elements 590, 594, 598, 604, 608, 612 and 616. The row addressing lead 778 is also coupled to one of the read coils of the word including memory elements 592, 596, 600, 606, 610, 614 and 618.

The row addressing leads 776 and 778 are coupled to a row selection driver circuit 794 similar to the arrangement of FIG. 7 responding to a read pulse generator to apply pulses of a wave form 796 to a selected column addressing lead 776 or 778. The column addressing leads 770, 780, 782, 784, 786, 788, 790 and 792 are coupled to a column selection driver circuit 798 similar to the arrangement of FIG. 7 responding to the read pulse generator to apply pulses of a waveform 800 to a selected column addressing lead. Also, similar to the arrangement of FIG. 7, a detent current is maintained in the read coils by the driver circuits 794 and 798 in a direction opposite to the driving current of the pulses of the waveforms 796 and 800.

Thus, during reading at a time $T_1$ (FIG. 4), a row addressing lead such as 776 and a column addressing lead such as 770 are energized in response to pulses of the waveforms 796 and 800 reversing the direction of detent current flow to select a word of four bits including the memory elements 586, 690, 694 and 698 (FIG. 10). From each element storing a bit position of the selected word as the domain wall moves to the neutral position, a positive or negative signal representing a stored "zero" or "one" similar to the waveform 102 of FIG. 4 is applied to each of the four sense and control transformer such as 652. Similar to the discussion relative to FIG. 5, the sensed signal is applied to a gating circuit and to an output lead for utilization in a computer system, for example.

At time $T_2$ a source of write pulses as shown in FIG. 7 applies a pulse of a selected polarity similar to the waveform 359 through a lead such as 656 to the center tap of each of the four sense and control transformers such as 652 for Bit No. 1. Thus, the domain walls in the memory elements 586, 690, 694 and 698 are moved to a selected position adjacent to the domain forming coil where it is reliably maintained by the field of the detent current. Therefore, a word of any desired binary combination may be written into the four bit positions of the word read during the previous period. Because the sequential operation is similar to that explained in relation to the arrangements of FIGS. 5 and 7, the operation thereof will not be explained in further detail.

The woven memory of FIGS. 8, 9 and 10 has been explained relative to a system utilizing a detent current flowing through the read coils in a direction opposite to the current when addressing a word for reading. It is to be noted that the principles of the arrangement of FIGS. 8, 9 and 10 are equally applicable to a system having separate detent coils woven into the array. In such a system, a dotted wire 792 of FIG. 10 may be woven between the wire 710, for example, to provide the detent action for the system in accordance with the principles of FIG. 5. The wire 792 is woven on both sides of each domain forming coil and coupled to a suitable D.C. source in accordance with the principles of the arrangement of FIG. 5 to develop magnetizing forces such as shown by arrows 815 and 817.

Thus, there has been described a simplified memory element that includes first and second magnetic domains in a magnetic medium with the position of the domain wall representing binary information. In a word organized memory utilizing the memory elements, reading is performed by a row and column addressing arrangement utilizing switching means in the word lines and writing is performed through the sense coils without addressing. In another memory array in accordance with the invention, Kirchhoff techniques are utilized rather than non-linear switching means in the word lines and an even further simplified memory is provided. The memory element and memory systems in accordance with the invention are applicable to loom type weaving for relatively simple production.

What is claimed is:

1. A memory element comprising a magnetic medium, first means for establishing first and second magnetic domains of opposite polarity in said medium with a wall therebetween, second means for moving said wall from a first position to a selected position of a plurality of second positions and for developing a signal when said wall moves from the selected second position to said first position, third means for retaining said wall at the selected second position, and fourth means for moving said wall to said first position.

2. A memory element comprising a magnetic medium, first means magnetically coupled to said medium for establishing first and second magnetic domains of opposite polarity having a wall therebetween, second means magnetically coupled to said medium for moving said wall from a central first position to a selected one of a plurality of second positions, said wall being retained thereat, and third means magnetically coupled to said medium for moving said wall from the selected one of a plurality of second positions to said central first position to develop a signal in said second means.

3. A device comprising a magnetic medium, first means coupled to said medium for establishing regions of opposite magnetic polarity having a junction therebetween, second means magnetically coupled to said medium for selectively moving said junction to a first or a second position from a neutral position, third means magnetically coupled to said medium for retaining said junction at the selected first or second position, and fourth means magnetically coupled to said medium for moving said junction from the selected first or second position to said neutral position, said second means developing a signal representative of the movement of said junction from said first or said second position to said neutral position.

4. A device comprising a magnetic medium, first and second means coupled to said medium for establishing regions of opposite magnetic polarity having a junction therebetwen, third means magnetically coupled to said medium for selectively moving said junction to a first or a second position from a central position and responding to movements of said junction from said first and said second position to said central position to develop signals of respective first and second polarities, fourth means magnetically coupled to said medium for retaining said junction at the selected first or second position, and fifth means magnetically coupled to said medium for moving said junction from the selected first or second position to said central position.

5. A device comprising a magnetic medium, first means coupled to said medium for establishing regions of opposite magnetic polarity having a junction therebetween, second means magnetically coupled to said medium for selectively moving said junction to a first or a second position from a central position and for retaining said junction thereat, and third means magnetically coupled to said medium for moving said junction from the selected first or second position to said central position, said second means developing a signal representative of the movement of said junction from said first or said second position to said central position.

6. A storage element comprising an elongated magnetic medium, domain forming means magnetically coupled to said medium for establishing first and second domains therein of opposite magnetic polarity, said domains having a wall therebetween, digit means magnetically coupled to said medium for selectively moving said wall from a central position to a first or second position in said medium for storing information therein, detent means magnetically coupled to said medium for maintaining said wall in said selected first or second position, and read means magnetically coupled to said medium for moving said wall to said central position, said digit means sensing a signal as said wall moves to said central position representative of the stored information.

7. A memory element comprising a magnetic medium, first and second means magnetically coupled to said medium a selected distance apart for establishing first and second magnetic domains of opposite magnetic polarity having a wall therebetween, third means magnetically coupled to said medium substantially between said first and second means for selectively developing a magnetizing force in a first or a second direction for moving said wall to a first or second position respectively adjacent to said first or second means, fourth and fifth means magnetically coupled to said medium for developing magnetizing forces for retaining said wall at said first or second position, and sixth means magnetically coupled to said medium substantially betwen said first and second means for simultaneously developing two opposite magnetizing forces for moving said domain wall to a central position to develop an output signal in said third means.

8. A storage device comprising an elongated magnetic medium, first and second domain forming means magnetically coupled to said magnetic medium for establishing therebetwen a region of first and second magnetic domains of opposite polarity having a common domain wall, digit coil means magnetically coupled to said magnetic medium between said first and second domain forming means for propagating said domain wall to a position adjacent to said first or second domain forming means, detent means magnetically coupled to said magnetic medium adjacent to said first and second domain forming means for maintaining said magnetic wall adjacent to said first or said second domain forming means, and read coil means magnetically coupled to said magnetic medium between said first and second domain forming means for propagating said domain wall to a central position adjacent to said digit coil means, said digit coil means responding to said domain wall being propagated from a position adjacent to said first or second domain forming means to said central position to respectively form an output signal of a first or a second polarity.

9. A storage element responsive to a read pulse and to a write pulse of a selected polarity comprising an elongated magnetic medium, first and second domain forming means magnetically coupled to said medium for establishing first and second magnetic domains of opposite polarity along said medium, a digit coil magnetically coupled to said medium and responsive to the write pulse of a selected polarity to expand one and compress the other of said first and second domains, detent means magnetically coupled to said medium for maintaining said domains in the expanded and compressed condition, and first and second read coils magnetically coupled to said medium and responsive to the read pulse to change the lengths of said first and second domains to a substantially equal condition, said digit coil responding to the movement of said domains during application of said read pulse to develop an information signal.

10. A two state storage device comprising an elongated magnetic medium, first and second domain forming means magnetically coupled to said medium with a selected distance therebetween for establishing first and second magnetic domains of opposite polarity separated by a domain wall region, a sense and control means magnetically coupled to said medium between said first and second domain forming means for selectively moving said domain wall adjacent to said first or second domain forming means, first and second detent means magnetically coupled to said medium respectively adjacent to said first and second domain forming means having a magnetic force opposite to that of said first and second domain forming means for retaining said domain wall at the selected position, read means magnetically coupled to said medium between said first and second domain forming means having a first portion for developing a magnetic force opposite to said first detent means and having a second portion for developing a magnetic force opposite to said second detent means, said read means moving said domain wall from a selected position adjacent to said first or second detent means to a position adjacent to said sense and control means to form a signal respectively of a first or a second polarity in said sense and control means.

11. A memory element comprising a magnetic wire, a digit coil wound around said magnetic wire, first and second domain forming coils wound around said magnetic wire in respectively opposite directions adjacent to opposite ends of said digit coil, a first source of current coupled to said first and second domain forming coils for establishing first and second magnetic domains in said magnetic wire of opposite polarity having a wall region therebetween, first and second read coils wound around said magnetic wire in opposite directions substantially between said first and second domain forming coils, a second source of current coupled to said digit coil for passing current in a selected direction therethrough to move said domain wall from a neutral position between said first and second domain forming coils to a selected first or second position adjacent to said first or second domain forming coils, first and second detent coils wound around said magnetic wire, a third source of current coupled to said first and second detent coils for passing current therethrough to retain said wall region in the selected first or second position, and a fourth source of current coupled to said first and second read coils for moving said wall region to said neutral position to develop a signal of a first or a second polarity in said digit coil representative of said wall region moving from said first or said second position.

12. A memory element comprising an elongated magnetic medium, first and second domain forming coils magnetically coupled to said medium for establishing first and second states of magnetization along said medium with a wall therebetween, a digit coil magnetically coupled to said medium between said first and second domain forming coils, write and sense means coupled to said digit coil for applying pulses therethrough in a selected direction to move said wall from a neutral position to a selected position adjacent to said first or said second domain forming coil and for responding to the movement of said wall from the position adjacent to said first or second domain forming means to the neutral position to develop an output signal of a first or a second polarity, first and second read coils magnetically coupled to said medium between said first and second domain forming coils for moving said wall to said neutral position, and control means coupled to said first and second read coils for applying a current in a first direction to maintain said wall at said first and second domain forming coil after being moved thereat by said write and sense means and for applying a current in a second direction to move said domain wall to said neutral position to develop said output signal.

13. A storage system comprising an elongated magnetic medium, first coil means magnetically coupled to said medium for establishing first and second magnetic domains of opposite polarity having a domain wall therebetween in a storage region, said storage region having first and second ends, write coil means magnetically coupled to said medium adjacent to said storage region for selectively moving said domain wall to a position adjacent to said first or second end of said storage region, read coil means magnetically coupled to said medium adjacent to said storage region for moving said domain wall to a central position of said storage region, said write coil means developing informational signals in response to said read coil moving said domain wall to said central position, and a source of direct current coupled to said read coil means for establishing forces to maintain said domain wall at the selected first or second end of said region until being moved to said central position by said read coil means.

14. A memory system comprising a plurality of row leads, a plurality of column leads, a plurality of word elements arranged in rows and columns, each word element including a magnetic medium and a plurality of domain forming coils magnetically coupled to said medium at selected distances apart to form memory regions, said domain forming coils establishing magnetic domains of opposite polarity in each memory region with a domain wall therebetween, a plurality of read coils with one magnetically coupled to said medium between each of said adjacent domain forming coils for moving said domain walls to central positions of said memory regions, the read coils of each word element coupled in series between selected ones of said row leads and column leads, a plurality of write coils magnetically coupled to said medium at each of said memory regions, a source of write pulses coupled to said plurality of write coils for selectively moving said domain walls from said central position to a stored first or second position adjacent to a domain forming coil at a first or second end of each memory region, a plurality of detent coils magnetically coupled to said medium with one adjacent to said domain forming coils in each memory region for developing forces to retain said walls at the selected first or second positions of said memory regions, and a source of row addressing pulses and a source of column addressing pulses respectively coupled to said row and column leads for moving said domain walls in a selected word element to the central position to develop signals in said write coils thereof representative of said stored first and second positions.

15. A memory system comprising a plurality of row leads, a plurality of column leads, a plurality of word elements arranged in rows and columns, each word element including a magnetic medium and a plurality of domain forming coils magnetically coupled to said medium at selected distances apart to form memory regions, a first source of current coupled to said domain forming coils establishing magnetic domains of opposite polarity in each memory region with a domain wall therebetween, a plurality of first and second read coils with different first and second coils magnetically coupled to said magnetic medium between each of said adjacent domain forming coils for moving said domain walls to central positions of said memory regions, the read coils of each memory element coupled in series between selected ones of said row leads and column leads, a plurality of write coils with a different one magnetically coupled to said medium at each of said memory regions, a source of write pulses coupled to said plurality of write coils for selectively moving said domain walls from said central position to a stored first or second position adjacent to a domain forming coil at a first or second end of each memory region, second and third sources of current respectively coupled to said row leads and said column leads for passing detent current through said read coils to develop forces to retain said domain walls at the selected first or second positions of said memory regions, and a source of row addressing pulses and a source of column addressing pulses respectively coupled to said row and column leads for passing current in a selected word element in a direction opposite to said detent current for moving said domain walls in the selected word element to said central position to develop signals in said write coils of the selected word element representative of said stored first and second positions.

16. A memory system comprising a plurality of row leads, a plurality of column leads, a plurality of word elements arranged between said row leads and said column leads, each word element including a magnetic medium and a plurality of domain forming coils magnetically coupled to said medium at selected distances apart to form memory regions, each region forming a different binary position of said word, said domain forming coils establishing magnetic domains of opposite polarity in each memory region with a domain wall therebetween, a plurality of read coils with a different one magnetically coupled to said medium between each of said adjacent domain forming coils for moving said domain walls to a central position of said memory region, the read coils of each word element coupled in series between selected row leads and column leads, a plurality of digit coils magnetically coupled to said medium at each of said memory regions for selectively moving said domain wall from said central position to a position adjacent to a domain forming coil at a first or second end of each memory region during writing, first impedance means coupled to one end of each of said row leads, second impedance means coupled to one end of each of said column leads, first and second sources of potential coupled respectively to said first and second impedance means to pass a current through said domain forming coils in a first direction for applying a force to maintain said domain walls at a selected position adjacent to said first or second domain forming coils after writing, first and second sources of read pulses coupled respectively to said row leads and said column leads for addressing a word element and passing current in a second direction through said read coils to move said domain walls in said addressed word element to the central position to develop a positive or a negative signal in said digit coils of the addressed word, a plurality of transformers having first and second windings with said first winding having a center tap, the first winding of each of said transformers having one end coupled to said digit coils of corresponding binary positions of a first portion of the word elements and the other end coupled to the digit coils of corresponding binary positions of the remainder of said word elements, a source of write pulses coupled to the center taps of each of said first windings, a source of clock pulses coupled to said first and second sources of read pulses and to said source of write pulses, a plurality of inhibit gates coupled to the second windings of said transformers, a strobe forming circuit coupled between said source of clock pulses and said inhibit gates for applying a strobe signal thereto during reading, said inhibit gates responding to said strobe signal and the absence of a signal from said digit coils to form an error signal.

17. A woven memory element comprising a plurality of magnetic wires arranged in layers adjacent to each other, a plurality of digit coils with a different one wound continuously around each of said magnetic wires, a first wire woven around opposite sides of adjacent magnetic wires of said plurality of layers to form a first common domain forming coil, a second wire woven around opposite sides of adjacent magnetic wires of said plurality of layers adjacent to said first common domain forming coil to form first and second read coils, said first wire wound around opposite sides of said magnetic wires of said plurality of layers to form a second common domain coil adjacent to said first and second read coils, a source of current coupled to said first and second domain forming coils for establishing first and second magnetic domains therebetween of opposite magnetic polarity joined by a domain wall, a plurality of first means coupled to said digit coils for applying a pulse therethrough for selectively moving said domain walls from a central position in each layer to a first or a second position respectively adjacent to said first or second domain forming coil, second means coupled to said read coils for moving said domain wall from said first or second position to said central position to develop a sensed signal of respectively a first or second polarity in each of said first means.

18. A memory system comprising a plurality of first and second magnetic wires with said first and second magnetic wires arranged adjacent to each other in a plurality of layers, a plurality of first and second digit coils respectively wound around said first and second magnetic wires in each of said layers, a first wire woven around opposite sides of adjacent layers of magnetic wires to form a plurality of common domain forming coils in said plurality of first and second wires, each adjacent two common domain forming coils forming a plurality of bit elements representing a word, a second wire woven around opposite sides of adjacent magnetic wires of said plurality of layers between each adjacent pair of common domain coils to form read coils in each bit element of each word, a source of current coupled to said first wire for controlling said domain forming coils to establish first and second magnetic domains of opposite polarity in each bit element with a domain wall therebetween, a plurality of transformer means with one coupled to each of said first and second digit coils for applying a write pulse for moving in a bit element of each layer said domain walls from a central position to a selected first or a second position respectively adjacent to one or the other domain forming coil, a plurality of row leads coupled to one end of said read coils, a plurality of column leads coupled to the other ends of said read coils, a source of detent current coupled to said row leads and to said column leads for developing forces in said read coils to retain said walls at said first or second positions, and a source of read pulses coupled to said row leads and column leads for moving said domain walls in a selected word in each bit element thereof from said first or second positions to said central position to apply a signal of a first or a second polarity from each of said digit coils of said selected word to said transformer means representative of said first or second position.

References Cited by the Examiner

UNITED STATES PATENTS

| | | | |
|---|---|---|---|
| 2,919,432 | 12/1959 | Broadbent | 340—174 |
| 3,040,305 | 6/1962 | Gianola | 340—174 |
| 3,083,353 | 3/1963 | Bobeck | 340—174 |
| 3,084,336 | 4/1963 | Clemons | 340—174 |

IRVING L. SRAGOW, *Primary Examiner.*